United States Patent [19]
Teh

[11] Patent Number: 5,651,089
[45] Date of Patent: Jul. 22, 1997

[54] BLOCK SIZE DETERMINATION ACCORDING TO DIFFERENCES BETWEEN THE PEAKS OF ADJACENT AND NON-ADJACENT BLOCKS IN A TRANSFORM CODER

[75] Inventor: Do Hui Teh, Singapore, Singapore

[73] Assignee: Matsushita Electric Industrial Co., Ltd., Japan

[21] Appl. No.: 161,797

[22] Filed: Dec. 6, 1993

[30] Foreign Application Priority Data

Feb. 19, 1993 [JP] Japan ..................... 5-030711

[51] Int. Cl.$^6$ ........................... G10L 3/02
[52] U.S. Cl. ........................... 395/2.12; 395/2.2
[58] Field of Search ............... 395/2.2, 2.22, 395/2.23, 2.12; 381/40

[56] References Cited

U.S. PATENT DOCUMENTS 5,341,432  8/1994  Suzuki et al. ............... 381/34

FOREIGN PATENT DOCUMENTS

| 0446031 | 9/1991 | European Pat. Off. . |
| 0506394 | 9/1992 | European Pat. Off. . |
| 9116769 | 10/1991 | WIPO . |
| 9217884 | 10/1992 | WIPO . |

OTHER PUBLICATIONS

Parsons, T., *Voice and Speech Processing*, 1986, Mc Graw–Hill Inc., pp. 205–207.

*Primary Examiner*—Allen R. MacDonald
*Assistant Examiner*—Robert Mattson
*Attorney, Agent, or Firm*—Beveridge, DeGrandi, Weilacher & Young, L.L.P.

[57] ABSTRACT

A method for determining the block size of a transform coder in which the digital audio signals having spectral and temporal structure are decomposed into plural spectral frames. The method involves defining the audio signal into time intervals according to the temporal masking properties of a human auditory system; obtaining a peak value in each of these time intervals; calculating differences among the peak values; and selecting a block size based on a comparison of the differences against a predefined value.

3 Claims, 6 Drawing Sheets

| Unit Number | Spectral Line Number | Bit Allocation Data |
|---|---|---|
| Unit 0 | 8 | WL(0) |
| Unit 1 | 4 | WL(1) |
| Unit 2 | 4 | WL(2) |
| Unit 3 | 4 | WL(3) |
| | | |
| Unit 24 | 10 | WL(24) |
| Unit 25 | 10 | WL(25) |

FIG. 5

BLOCK SIZE DETERMINATION ACCORDING TO DIFFERENCES BETWEEN THE PEAKS OF ADJACENT AND NON-ADJACENT BLOCKS IN A TRANSFORM CODER

BACKGROUND OF THE INVENTION

1. Field of The Invention

This invention relates to the efficient information coding of digital audio signals for transmission or digital storage media.

2. Related Art of The Invention

Compression algorithms for wide band audio signals are finding wide-spread applications in recent years. In the area of consumer electronics, the digital compact cassette (DCC) and the mini-disc system (MD) are two applications of these compression algorithms. While the DCC system uses a compression algorithm that is based on sub-band coding, the MD system uses an algorithm that is based on a hybrid of sub-band and transform coding with the transform coding portion forming the backbone of the algorithm. This invention is related to the determination of the block size of the transform coder used in the MD system.

The MD system uses the ATRAC compression algorithm which is documented in chapter 10 of the MD system description by Sony in December 1991. The ATRAC algorithm compresses the input audio signals at a bit rate of 705.6 kbit/s/channel to a bit rate of 146.08 kbit/s/channel.

FIG. 3 shows the block diagram of the encoding process. The input time signals are first passed through a splitting filter bank, 1, 2, 3, to obtain the signals in three frequency bands. The lower two bands are each at half the bandwidth of the uppermost band. Block size decision, 4, is made for each band to determine the sample size or block mode for the windowing and transform process, 5, 6, 7. One of the two block modes available,—short block mode or long block mode, will be selected for each of the bands. The transformed spectral samples are grouped into units and in each unit, a scale factor is derived from the peak values of the samples in the unit, 8. Quantization, 10, is carried out on the samples using the scale factor and bit allocation information from the dynamic bit allocation module, 9. Now the unit is described as follows.

The audio signal is transformed into, for example, 256 spectral lines by MDCT. The spectral lines are grouped into plural units. In FIG. 4 the 256 pieces of spectral lines are grouped into 26 units numbered 0–25. The bit allocation data WL(u) is given by unit as shown in FIG. 5. In the example of FIGS. 4 and 5, the spectrum of 1–8 has same bit allocation data WL(0) and the spectral line numbers 9–12 have the same bit allocation data WL(1).

The block size decision plays an important role in transform coders to improve its time versus frequency performance. In the event of an attack (or a sharp rise of signal energy) in the signal, the singularities in the time signals need to be reflected in the coding or a pre-echo condition would occur, resulting in noise preceding the audio signal.

The block size decision method proposed in the MD system description is shown in FIG. 6. Step of numeral 1 is the peak value detection block. The adjacent peak values are compared in step of numeral 2, and step of numeral 3 contains the decision switch (threshold) to be compared. In step of numeral 4, mode 1, the short block mode is selected while in step of numeral 5, mode 4 or mode 3 is selected for the high or middle/low band respectively.

Meanwhile good block size decision is needed to reduce the pre-echo condition described earlier. The design of the block size decision hinges upon 2 important considerations.

Firstly, it is desirable to make the block length as long as possible because of greater frequency resolution. From real signal statistics and the physiology of the human ear in perceiving sounds, greater redundancy and irrelevancy can be removed with greater frequency resolution. Secondly, a conflicting condition to the first exists in that the audio signals are time-domain signals and some important cues need to be faithfully reproduced in time. In a transform coder, the block size selected determines the time versus frequency resolution. It is therefore important to detect the need to change the block size correctly for the optimum performance of the transform coder.

The prior art does not accurately reflect the proper design of the block size decision block. The block showing the process of 'compare adjacent peak values' in FIG. 2 can have the following 2 interpretations. Firstly, the procedure could be interpreted to mean comparing the two adjacent peak values, one from the previous time block and one from the next time block or secondly, it could mean comparing only one adjacent peak value namely, the one from the previous time block.

SUMMARY OF THE INVENTION

The present invention is intended to offer a block size determination technique of a transform coder to accurately determine a block size for realizing the most adequate transform coding process.

Therefore, the present invention consists of a method of determining a block size of a transform coder in which digital audio signals having spectral and temporal structure are decomposed into plural spectral frames. The steps include:

defining the audio signal into time intervals according to a temporal masking properties of a human auditory system;

obtaining a peak value in each of these time intervals;

calculating differences among the peak values; and selecting a block size based on a comparison of said differences against a predefined value.

Through the above described means, the present invention is able to detect attacks of a signal occurring within a 5 ms time interval approximately. By the means of computing and comparing the difference between the current and the previous two time intervals (approximately 10 ms), a more accurate detection of the attack can be done. Further, by comparing the differences against a positive pre-defined value, releases of a signal are ignored as the resultant post-echo effects will be masked by the post-masking phenomena. The accurate detection of the attack will ensure that the optimal blocksize is selected.

BRIEF DESCRIPTION OF THE DRAWINGS

FIG. 5 is the table of the bit allocation data WL.

PREFERRED EMBODIMENTS OF THE INVENTION

Firstly, the invention is bade based on considering the temporal masking conditions of pro-basking and post-masking. Pro-basking is a condition caused by a fast build up of loud sounds such that the sounds occurring in time before the attack are masked while post-masking is the lingering effect of the loud masker such that sounds occurring after this sound is also masked. Psychoacoustic experiments using single tones on pro-masking and post-masking showed that the pro-masking duration is between 5 to 20 ms. The post-masking duration is longer, lasting between 20 to 200 ms depending on the duration of the basker. For a masker duration as short as 5 ms, the post-masking duration is 20 ms. Translating these temporal effects to the design of the block size decision, these experiments show that attacks of a signal are important and cannot be ignored since in the long block mode, the transform coder has a time resolution of 11.6 ms. This is less than the post-masking duration. The release of the signal, on the other hand, is unimportant as the post-masking effects at the worst case of 11.6 ms away from the point of release suffers only a small degradation (about 3 dB) in its simultaneous masking threshold.

In the invention, attacks in a block of signal, whether a full spectrum or sub-sampled and filtered, are detected by grouping the audio samples into time intervals of approximately 5 ms, corresponding to the pre-masking duration. The peak values in each of these time intervals are determined and two differences in the logarithmic values of the peak amplitudes are calculated for each time interval. The first difference calculated is between the peak amplitude of the current time interval and the previous time interval while the second difference is calculated between the peak amplitude of the current time interval and the peak amplitude of the time interval prior to the previous time interval. These differences are then compared against a pre-defined positive value and the block size is determined from this comparison.

Figure 1:
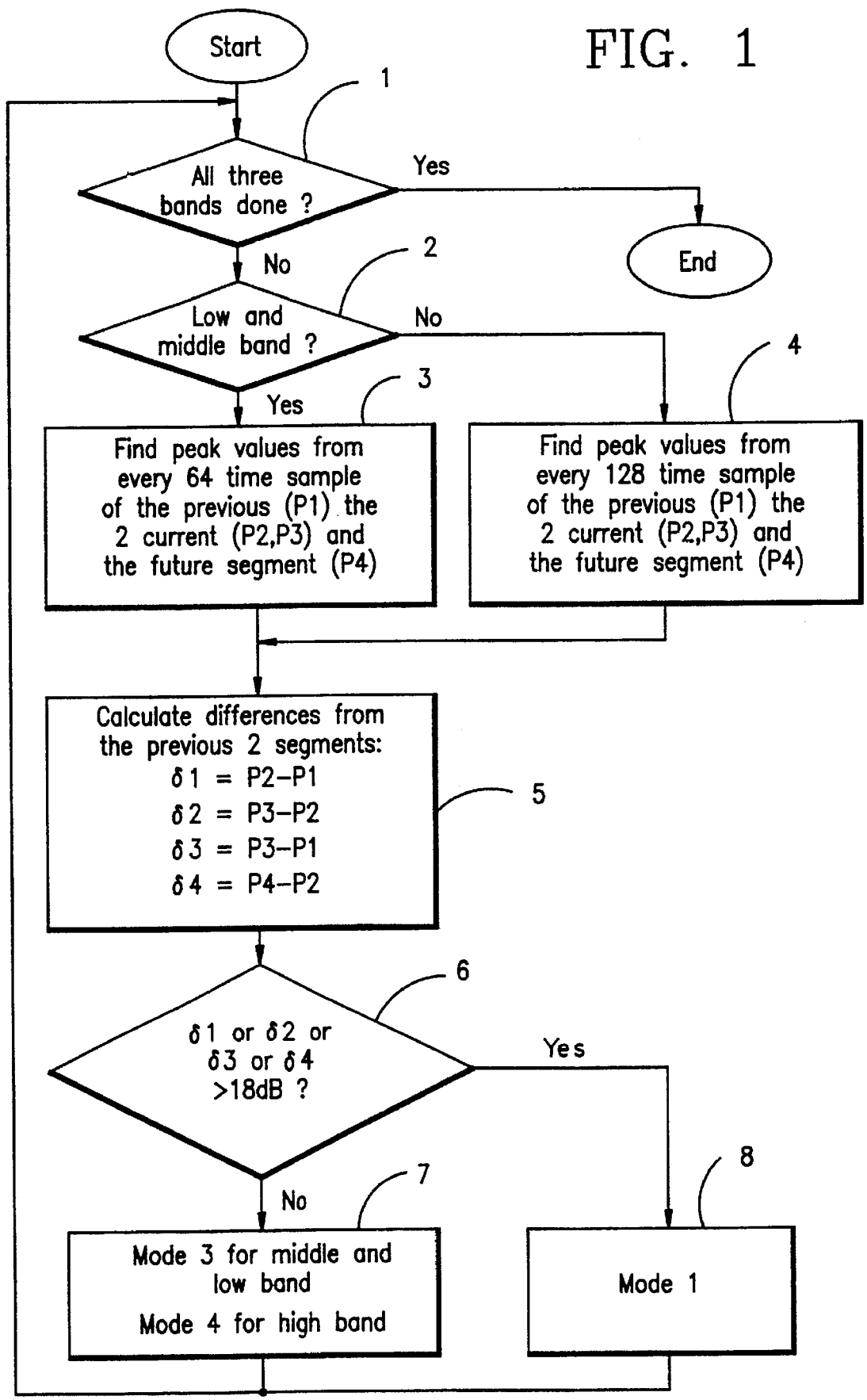
FIG. 1 is the flow chart of the present embodiment of the invention.

FIG. 1 shows the flow chart of the embodiment. In the present embodiment described, the invention is used to detect the attacks of a signal that has first been filtered by a 2 stage quadrature mirror filter (QMF). These sub-band signals are to be buffered into lengths of 256 samples for the low and middle band and 512 samples for the high band. The sampling frequency of the high band is double that of the low and middle bands. The buffered sub-band samples are made up of 64 previous samples, 128 current samples and 64 future samples due to the 50% overlapping in the MDCT (modified discrete cosine transform) process.

In FIG. 1, step of numeral 1 checks if all block size determination process has been done for all the three bands. Step of numeral 2 checks if the low or, middle band is currently being processed. If the low or middle band is currently being processed, step of numeral 3 then finds the peak values from every 64 time samples, corresponding to a time interval of 5.8 ms.

Figure 2:
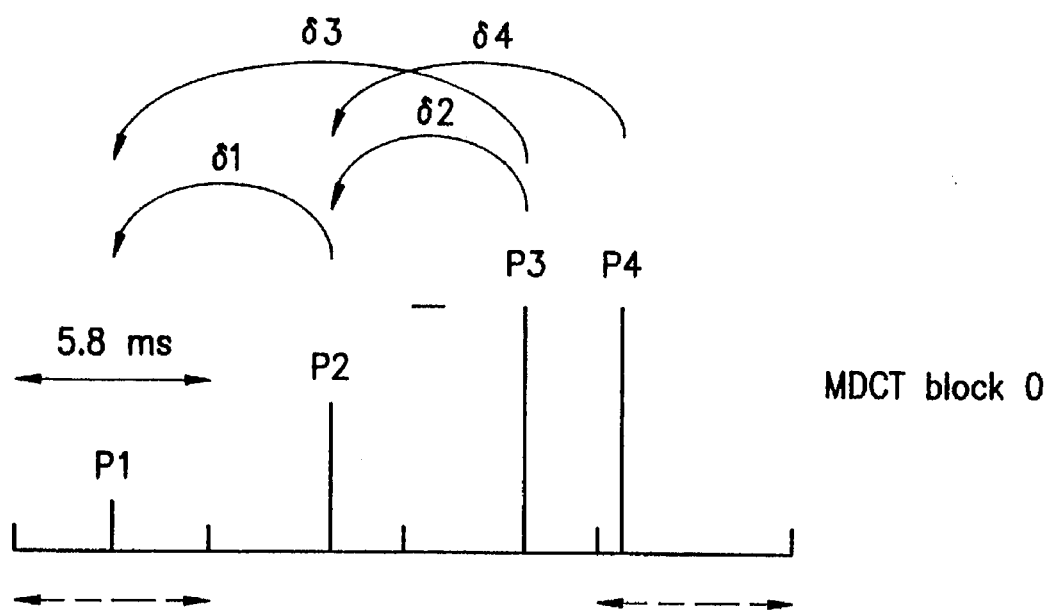
FIG. 2 is the illustration of how the said differences are calculated.
Figure 2:
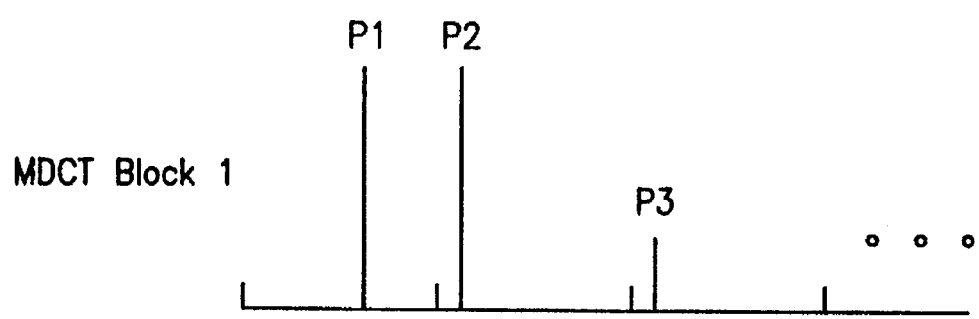
Figure 3:
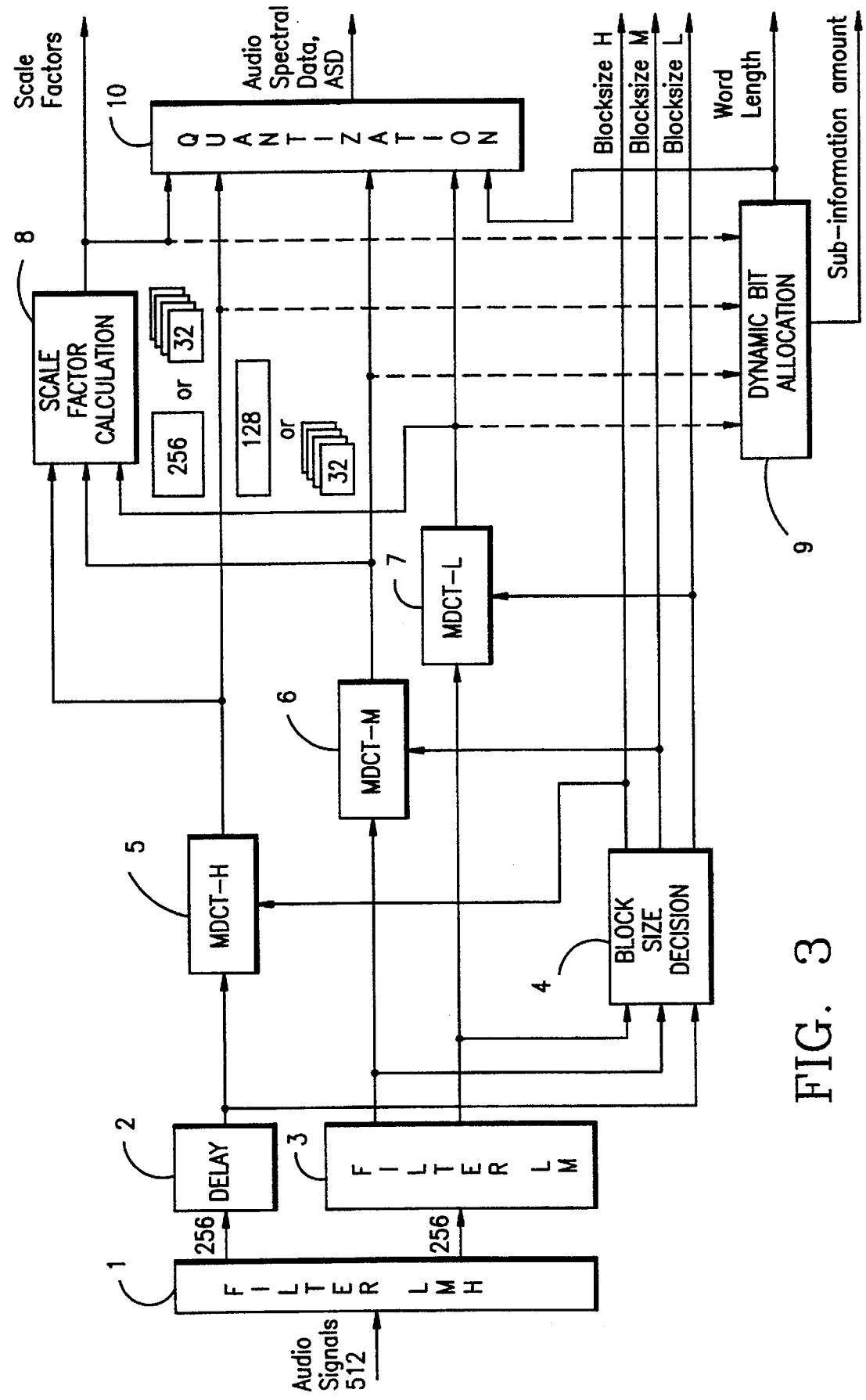
FIG. 3 is the encoding process of the prior art.
Figure 4:
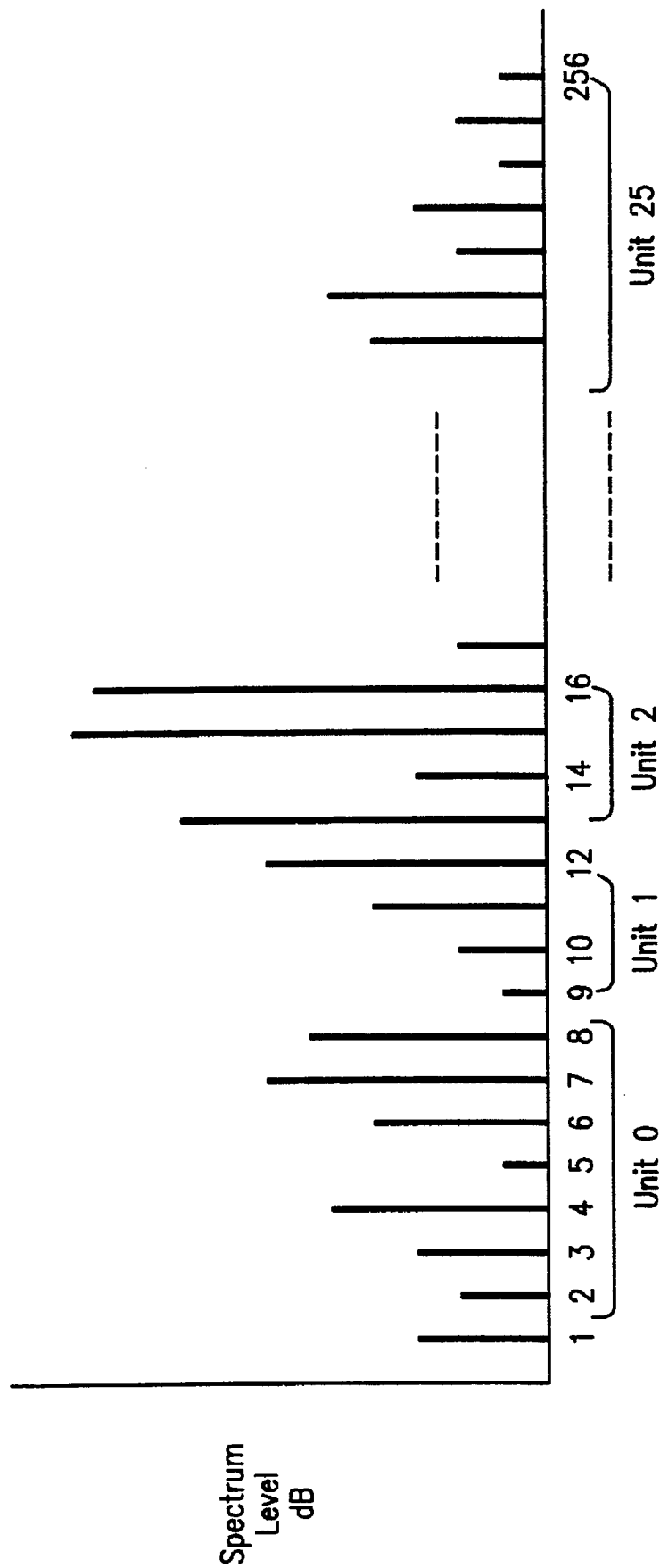
FIG. 4 is the illustration of spectrum grouped into 26 units.
Figure 6:
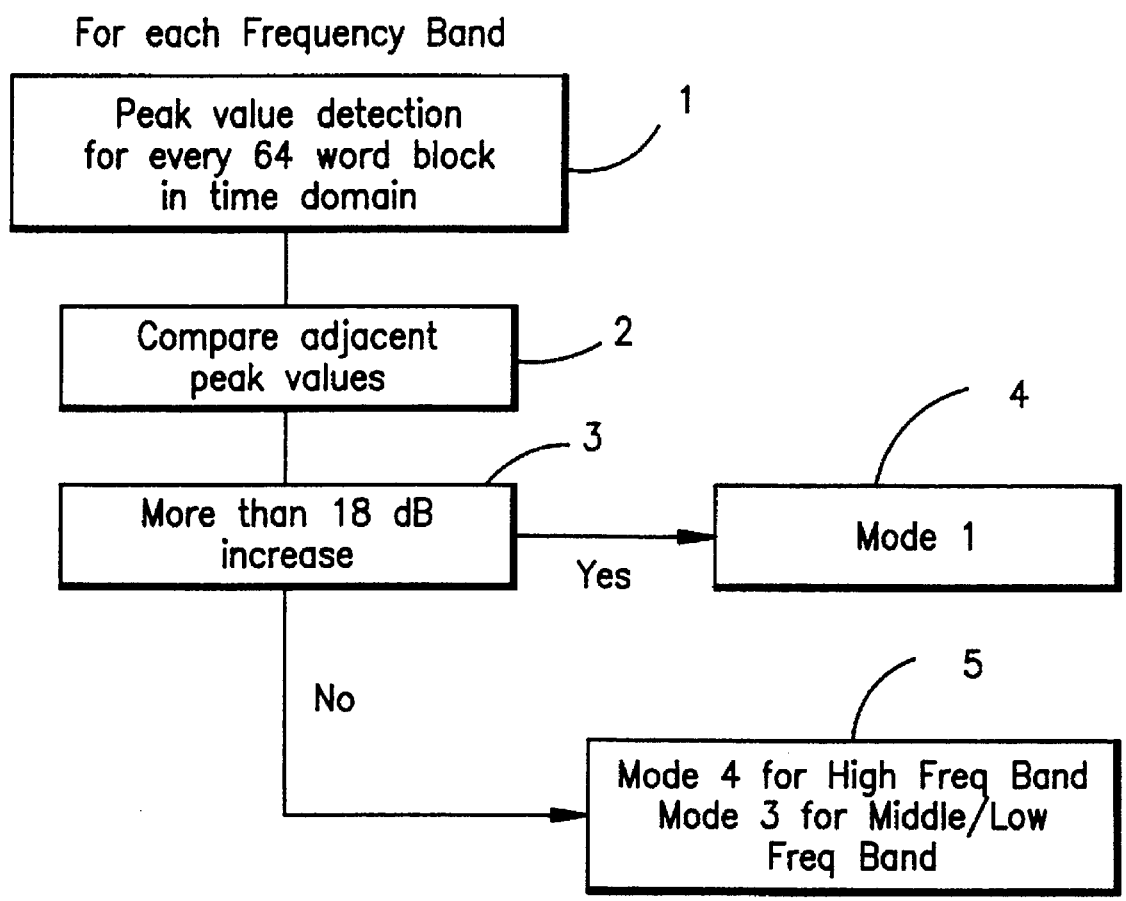
FIG. 6 is the flow chart of the prior art.

As is illustrated in FIG. 2, each band is made up of four 5.8 ms segments, one segment from the previous block, 2 segments from the current block and a segment from the next block. The peak values, P1, P2, P3 and P4 are calculated from each of these blocks. These values are in decibels and they are related to the peak values by $$P = 10 * \log_e [\text{absolute}(\text{peak amplitude})]$$

If the high band is currently being processed, then in FIG. 1, step of numeral 4 finds the peak values from every 128 time samples, P1, P2, P3 and P4 instead of 64 as done in the prior art. This again corresponds to a time interval of 5.8 ms. Comparisons are made for the previous, current and future blocks by calculating the differences $\delta 1, \delta 2, \delta 3$ and $\delta 4$ in numeral 5. These differences are then compared against the pre-defined threshold of 18 dB in step of numeral 6. If the threshold is exceeded, then mode 1 is selected in step of numeral 8 but if the differences are below the threshold, then mode 3 is selected for the low or middle band while mode 4 is selected for the high band in step of numeral 7.

Testings done with critical signals like glockenspiel and triangle shows a decrease in the detection of noticeable artifacts. There is also a need for the least usage on resources such as RAM, ROM, computational steps and execution time. This invention is able to meet all the above requirements.

The invention is tested to be effective in detecting attacks of the signal and as the release of the signal is irrelevant, no computational time is wasted in detecting the release of the signal. The application of this block size decision technique results in a simple, effective and accurate way of controlling time-domain related artifacts for transform coders.

What is claimed is:

1. A method of determining block sizes in a transform coder process which decomposes digital audio signals having spectral and temporal structure into plural spectral frames, comprising:

defining for a digital audio signal, a plurality of time intervals according to temporal masking properties of a human auditory system, said plurality of time intervals including a current time interval, a previous time interval preceding said current time interval and a time interval preceding said previous time interval;

obtaining a peak value in each of said time intervals;

calculating a first difference between said peak value of said current time interval and said peak value of said previous time interval;

calculating a second difference between said peak value of said current time interval and said peak value of said time interval preceding said previous time interval;

selecting a block size of a block which includes said current time interval based on whether said first difference or said second difference exceeds a predefined value.

2. A method of determining block sizes in a transform coder process which decomposes digital audio signals having spectral and temporal structure into plural spectral frames, comprising:

defining for a digital audio signal, a plurality of time intervals according to temporal masking properties of a human auditory system, said plurality of time intervals including a current time interval, a previous time interval preceding said current time interval and a future time interval;

obtaining a peak value in each of said time intervals;

calculating a first difference between said peak value of said current time interval and said peak value of said previous time interval;

calculating a second difference between said peak value of said future time interval and said peak value of said previous time interval;

selecting a block size of a block which includes the current time interval based on whether said first difference or said second difference exceeds a predefined value.

3. A method of determining a block size for a frame which is a part of a digital audio signal having temporal structure, said block size being used for a transform coding process which composes digital audio signals into frequency spectral frames, comprising steps of;

defining for said digital audio signals, a plurality of time intervals according to temporal masking properties of a human auditory system, said frame being composed of four continuous time intervals, obtaining a peak value in each of said time intervals, calculating a first difference between said peak value of one of said time intervals and said peak value of an adjacent time interval, calculating a second difference between said peak value of said one of said time intervals and said peak value of another of said time intervals, selecting said block size for said frame, based on whether said first difference or said second difference exceeds a predefined value.

* * * * *